April 12, 1960 G. WHITE 2,932,357
METHOD AND APPARATUS FOR RECORDING SEISMIC SIGNALS
Filed Feb. 8, 1955 3 Sheets-Sheet 1

INVENTOR
GALE WHITE
ATTORNEYS

INVENTOR
GALE WHITE

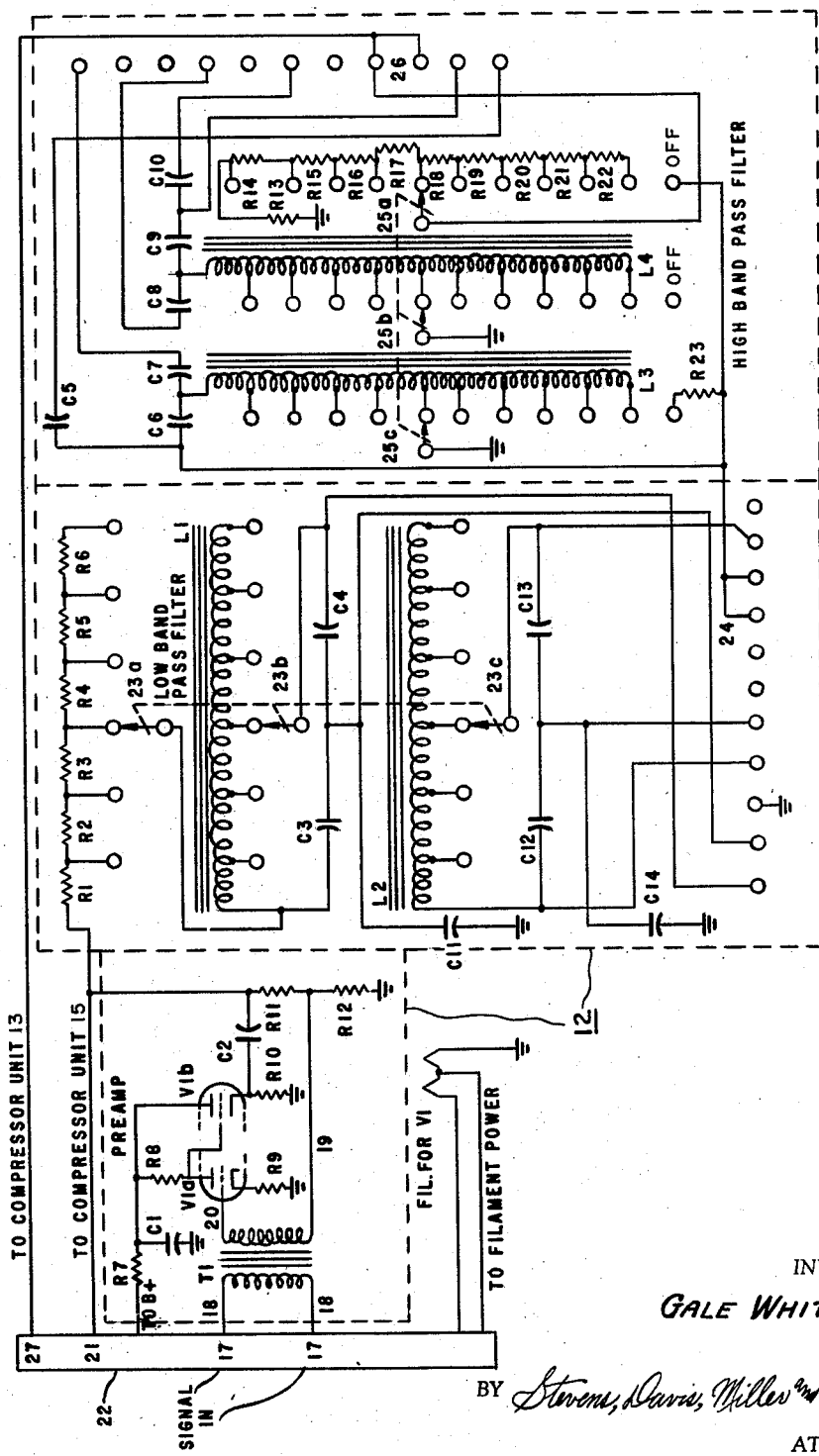

United States Patent Office 2,932,357
Patented Apr. 12, 1960

2,932,357

METHOD AND APPARATUS FOR RECORDING SEISMIC SIGNALS

Gale White, Houston, Tex., assignor to Texas Instruments Incorporated, Dallas, Tex., a corporation of Delaware Application February 8, 1955, Serial No. 486,779

11 Claims. (Cl. 181—.5)

This invention relates to methods and apparatus for geophysical exploration by seismic techniques, and more particularly to an apparatus and method for amplifying and recording seismic signals.

Geophysical exploration by seismic methods commonly involves the steps of detonating an explosive charge on or beneath the surface of the earth, detecting the resulting seismic impulses at a plurality of spaced points remote from the point of detonation, converting the detected seismic impulses into electrical signals, amplifying the signals and recording the amplified signals. Common methods used for recording these signals include multi-channel magnetic recorders and multi-element recording galvanometers. The signals from each of the individual detectors reach the recorder through separate amplifier channels and are recorded on individual tracks side by side on the recording medium. These records are later inspected and interpreted to determine the location of subsurface geological formations which indicate the possible presence of oil deposits.

The amplitudes of the seismic impulses vary greatly, and a problem arises in recording signals of large amplitude at a level which will not exceed the physical limitations of the recording track while recording the impulses of smaller amplitude at a level which will produce variations on the record of sufficient magnitude to permit ready interpretation. A common solution to this problem is to employ amplifying equipment in which gain is variable and is automatically controlled in response to the variation in amplitude of the seismic signal being received. Amplifiers so functioning are described in prior patents issued to H. R. Prescott, No. 2,158,198, May 16, 1939; to J. P. Minton, No. 2,265,538, December 9, 1941; to A. J. Hermont et al., No. 2,547,703, April 3, 1951; and to M. B. McCarty, No. 2,558,868, July 3, 1951.

Recent refinements in the automatic gain control of seismic amplifiers have made possible the variation of gain over extremely wide ranges and with relatively short time constants. However, while solving one problem, these refinements have created a new problem in that the wave amplitudes on the record tend to assume greater uniformity, and the differences in amplitude of the seismic waves at different parts of the wave train are less readily recognized because of the tendency of the gain control to reduce or eliminate amplitude contrasts on the record. Since it is advantageous in the interpretation of these records to recognize differences in amplitude and to locate amplitude peaks which are more or less obscured by effective automatic gain control in the amplifier, several inventions have been disclosed which record on an additional track of the same record, and simultaneously with the recording of the seismic energy, a curve representing the instantaneous gain control voltage to the amplifier. See, for example, U.S. Patents No. 2,493,534, issued January 3, 1950, to J. E. Hawkins; No. 2,661,464, issued December 1, 1953, to A. Wolf; No. 2,193,620, issued March 12, 1940, to R. T. Cloud; and No. 2,424,705, issued July 29, 1941, to J. O. Parr, Jr. In such systems the amplitude of the voltage used as the automatic gain control is a function, not only of the input signal level, but also of the amplifier characteristics. Certain inaccuracies are inherent in the signal thus recorded due to the effects of amplifier characteristics on the amplitude of the automatic gain control voltage.

The present invention contemplates recording on the same record, but as a separate trace, a signal derived, not from the automatic gain control voltage, but directly from the output signal of one of the detectors, which signal will then serve as an indication of the true amplitude of the various signals which are recorded at that time from the other detectors. In order to confine a signal representative of such a wide amplitude range to a single recording track, the actual seismometer signal to be used for level indication is compressed by passing it through an amplifier having logarithmic characteristics, that is, an amplifier whose output is proportional to the logarithm of the input. This compression of the signal does not eliminate amplitude contrasts but merely reduces such contrast. Also, because seismic signals are often filtered before recording to accentuate certain frequencies and eliminate others, and because the absolute signal levels of the filtered signals are usually quite different from the absolute signal levels of the unfiltered signals, two logarithmic amplifiers are provided so that the incoming signal from the seismometer may be fed into two separate channels simultaneously, one of which contains a filter identical to that used in conjunction with the amplifiers of the seismic signal recording channels. In this way, two level indications may be recorded; one indicating the absolute level of the unfiltered seismic signals and one indicating the absolute level of the filtered seismic signals.

Further objects and features of the present invention will become apparent from the following description when taken in connection with the accompanying drawings in which:

Figure 2 is a schematic diagram of one embodiment of the circuitry employed in the preamplifier and filter unit of the log level indicator of the present invention.

Figure 1:
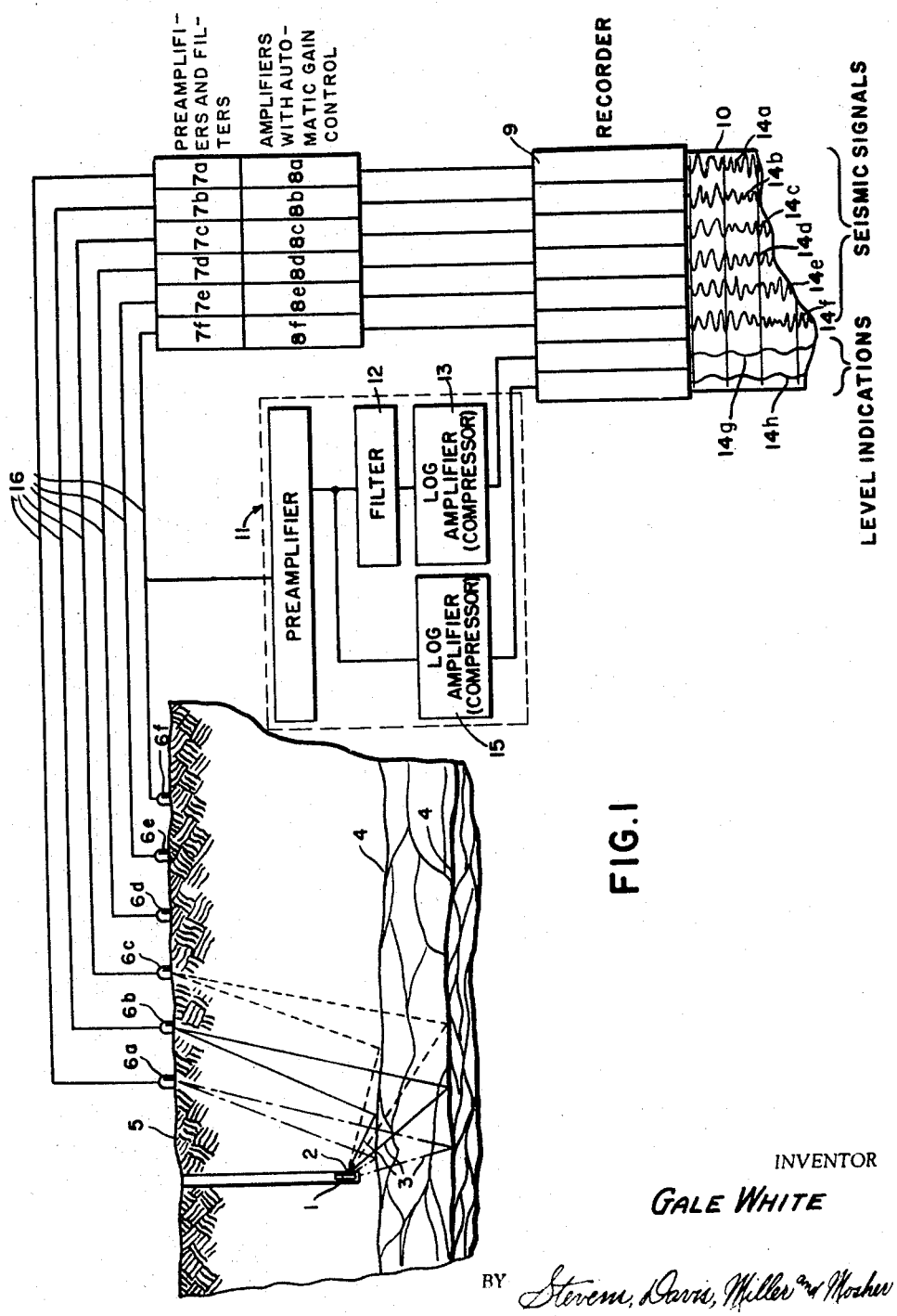
Figure 1 is a diagrammatic illustration of the seismic signal recording method of the present invention.

Referring now to Figure 1, an explosive charge 1 is detonated at the shot point 2 thus setting up vibrations 3 in the earth. These disturbances travel down through the earth and are partly reflected by each of the various geological formations 4 below the surface 5 of the earth to the seismometers 6a–6f which detect the reflected vibrations and convert the energy of these vibrations into electrical signals. The signals from each of the seismometers are then fed through lines 16 to the preamplifiers and filters 7a–7f which may be set as desired to accentuate certain frequencies of the signals and suppress others. In actual practice it may be desirable to filter the signals from only certain ones of the seismometers while allowing the signals from the other seismometers to pass unchanged. Next, the signals pass through amplifier channels 8a–8f with automatic gain control where they are amplified by varying degrees depending on their original amplitudes. The recorder 9 receives the signals from the amplifiers 8 and produces a permanent record 10 of the disturbances detected by the seismometers 6 or modified by the filters 7 and the automatic volume controlled amplifier 8.

In order to have a record of the changes produced in the original signals by the automatic gain control circuits of the amplifiers 8, a signal from any one of the seismometer lines 16 is fed directly to the log level indicator 11 where it is amplified without automatic gain control and fed simultaneously to two channels. The signal of the first channel goes to a filter unit 12 set to produce the same filtering action as is produced by the filters 7 associated with the seismic amplifiers 8. The signal from this filter 12 is then fed to an amplifier 13, the output of which is proportional to the logarithm of the input. This amplifier output signal goes to the recorder 9 and is recorded as a separate trace 14g as an indication of the absolute value of the signal level of the filtered signals which are recorded as some of the several other traces 14 at that time.

The signal to the second channel of the log level indicator 11 goes directly to another logarithmic amplifier 15, and then to the recorder 9 where it is recorded as trace 14h to indicate the absolute signal level of any unfiltered signals which may be recorded as some of the other traces 14 of the record at that time.

The steps of detonating an explosive charge and detecting the reflected and refracted disturbances created by the explosion at a plurality of remote spaced points by seismometers which change the disturbances to electrical signals and subsequently amplifying, with automatic gain control, filtering and recording the signals are not new and are, in fact, so well-known in the art that beyond the above description, further explanation of these steps seems unnecessary. Accordingly, the remainder of this description will be confined to the new and novel feature of the present invention, namely, the means provided to produce and record, on the same record with the modified seismometer signals, a signal indicative of the absolute amplitude level of the said seismometer signals.

Figure 3:
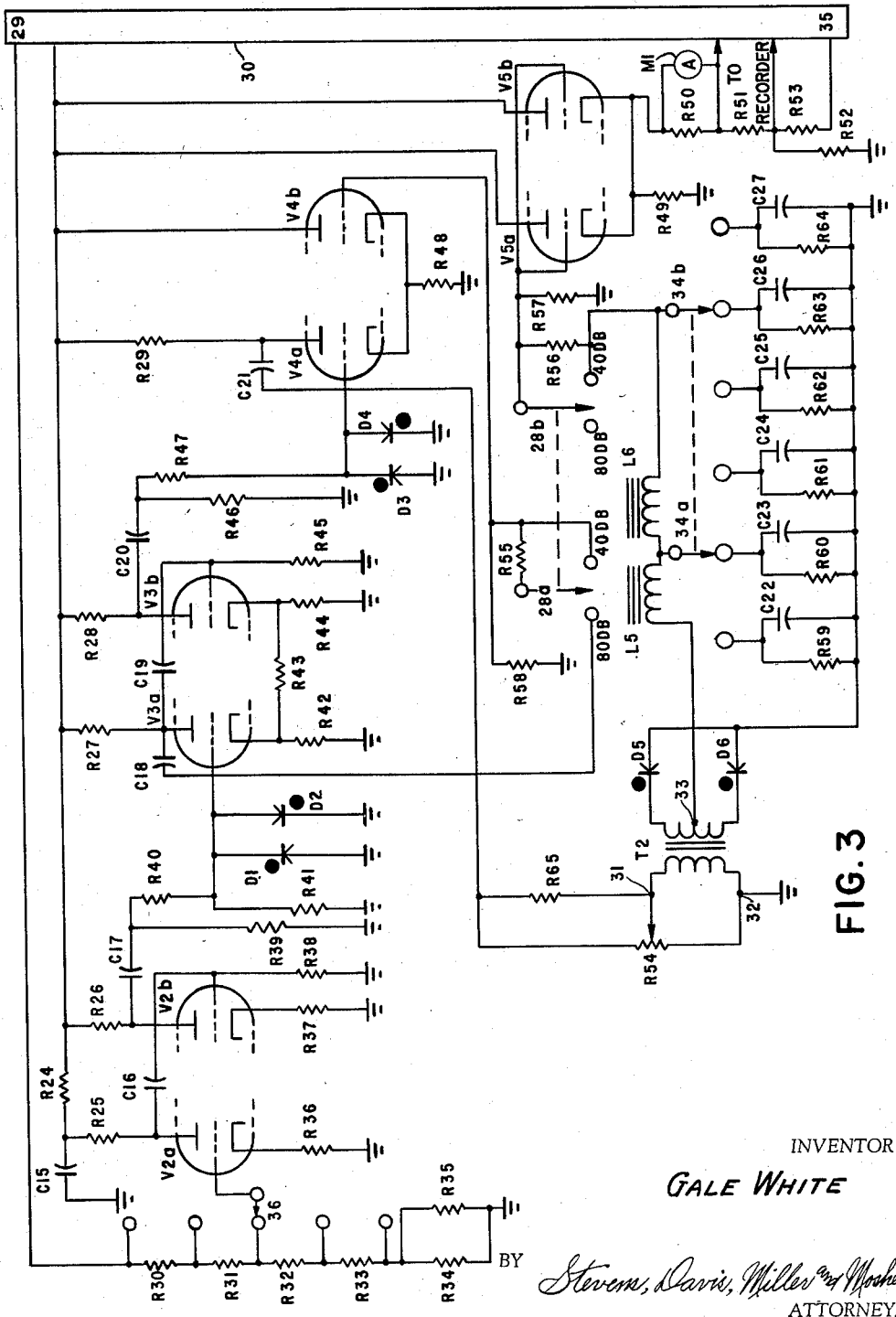
Figure 3 is a schematic diagram of one embodiment of the circuitry of the logarithmic amplifier of the present invention.

Figure 2 is a schematic diagram showing the circuitry employed in one embodiment of the preamplifier and filter unit 12 of the log level indicator 11. Figure 3 is a schematic diagram of one embodiment of the compressor unit sections 13 and 15 of the log level indicator 11, two of which are contained in the log level indicator. Although the three units are shown separately, their actions are so interdependent that they will be described as a single unit.

Beginning with Figure 2, the signals which are to be used to produce the signal level indication, and which may be taken from any of the seismometers 6, are impressed across the terminals 17 marked "signal in" and are fed through lines 18 and to the impedance matching transformer T1, then out line 19 to ground through resistor R12 and line 20 to the grid of amplifier tube V1a to be amplified. The cathode of tube V1a is connected to ground through resistor R9, and the plate is connected to B+ voltage through resistors R8 and R7. Condenser C1, connected from the junction of R7 and R8 to ground, acts in conjunction with resistor R7 to decouple the signal voltage from the B+ voltage. The unbypassed cathode resistor R9 acts to produce negative feed-back for amplifier stabilization. The output signal of the amplifier taken between load resistor R8 and the plate of the tube V1a is fed directly to the grid of the next tube V1b whose plate is connected to B+ voltage through the decoupling network C1 and R7 and whose cathode is connected through resistor R10 to ground. The tube V1b acts as an impedance matching cathode follower with the output signals taken between cathode resistor R10 and the cathode through condenser C2 and applied to load resistor R11 which is connected through resistor R12 to ground. This signal is then fed through a pin 21 of the plug 22 to compressor unit 15, the action of which will be described later. This signal is also fed to the resistance network consisting of R1, R2, R3, R4, R5, and R6. From this point, the signal passes through switch 23a to a low frequency band pass filter consisting of tapped inductance L1, tapped inductance L2 and condensers C3, C4, C11, C12, C13, and C14. Switch sections 23a, b, and c act to select the proper input resistance and inductance taps of inductances L1 and L2 and thus produce the desired cutoff frequency in the low band pass filter. The output from this filter is taken from switch 24 which functions to select the filter characteristics desired by effecting various internal connections in the low band pass filter and various output points.

The output of the low band pass filter, as selected by switch 24, is then fed to the high band pass filter consisting of inductances L3 and L4 and capacitors C5, C6, C7, C8, C9, and C10 together with resistances R13, R14, R15, R16, R17, R18, R19, R20, R21, R22, and R23. Associated with the high band pass filter is switch 25 consisting of sections 25a, b and c which select the proper taps for the inductance and resistance required to produce the desired frequency cutoff. Switch 26 functions to select various internal connections and output points of the filter to produce the desired filtering characteristics. The seismometer signal, as modified by the filters, is taken from switch 26 to a pin 27 of the plug 22 from which it goes to the second compressor unit 13.

As stated before, the purpose of the filter unit 12 is to produce a level indication signal which has been filtered in the same manner as the signals going through the filters 7 and the seismic amplifiers 8 to the recording unit 9. Therefore, it can be seen that the setting of switches 23, 24, 25, and 26 is determined by the type filters used in the seismic filter units 7 operating in conjunction with the seismic amplifiers 8. Further, two compressor units 13 and 15 are used, as noted above, in order that level indications for both the filtered and the unfiltered signals may be produced. The two compressor units 13 and 15 are identical in circuitry and action; therefore, the following description of Figure 3 applies to both compressor units 13 and 15.

The input signal, directly from the preamplifier through terminal 21 of plug 22 for the input of compressor 15 and from the filter circuits through terminal 27 of plug 22 for the input of compressor 13, is fed through terminal 29 of the plug 30 of Figure 3 to a voltage divider network consisting of resistors R30, R31, R32, R33, R34, and R35. The switch 36 acts as the sensitivity control of the compressor by selecting the proportion of the total input signal to be fed to the grid of tube V2a. When the moving contact of switch 36 is connected to the stationary contact between R30 and terminal 29 of plug 30, the unit operates at its highest sensitivity and when the moving contact is connected between R33 and the parallel combination of R34 and R35, the unit operates at its lowest sensitivity. The output signal selected by switch 36 is fed to the grid of amplifier tube V2a which has its plate connected through resistor R25 and the decoupling network consisting of resistor R24 and capacitor C15 to B+ voltage and its cathode connected to ground through resistor R36. Cathode resistor R36 is unbypassed to produce negative feed-back for stability in the amplifier. The output of amplifier tube V2a is taken between load resistor R25 and the plate of the tube through coupling capacitor C16 to the grid of amplifier tube V2b, which grid is connected to ground through resistor R38. The plate of amplifier tube V2b is connected to B+ through load resistor R26 and the cathode is connected to ground through unbypassed resistor R37. The output signal from the plate of amplifier V2b is fed through coupling capacitor C17 to a voltage divider network consisting of resistors R39, R40, and R41 and then to the grid of amplifier V3a. Two diodes D1 and D2 are connected from the grid of amplifier V3a to ground in parallel but in opposite polarity. The rectifiers, D1 and D2, do not conduct current until a certain voltage, known as the threshold voltage, is reached, but when the threshold voltage is reached, each of these diodes conducts during the half cycles when its plate is positive with respect to its cathode, and the currents increase at an increasing rate with an increase in voltage. The effect produced is that of a logarithmic voltage divider for voltages above the threshold voltage. Thus the signal on the grid of tube V3a is a logarithmic function of the output voltage of tube V2b for voltages above the threshold voltage of the diodes D1 and D2.

Tube V3a is another triode amplifier having its plate connected to B+ voltage through load resistor R27 and its cathode connected to ground through cathode resistor R42 and to the cathode of the next stage through resistor R43. The output of this amplifier is stabilized by negative feed-back through resistors R42 and R43. Two outputs are taken from the plate of amplifier V3a, one through condenser C18 to a terminal of switch 28a, which output will be discussed later, and one through condenser C19 to the grid of amplifier V3b which grid is connected to ground through resistor R45. Amplifier V3b is another negative-feed-back-stabilized triode amplifier with its plate connected to the B+ voltage through resistor R28 and its cathode connected to ground through resistor R44 and to the cathode of the preceding stage through resistor R43. The amplified signal is fed from the plate of amplifier V3b through coupling capacitor C20 to the grid of amplifier V4a through the non-linear voltage divider network comprised of resistor R46, resistor R47, and diodes D3 and D4. The signal fed to the grid of amplifier V4a, is again modified, but this time by the logarithmic functions of diodes D3 and D4 and at a much earlier time in the cycle because, although the threshold voltages of the diodes are the same, the signal is larger than that applied to diodes D1 and D2.

Amplifier V4a is merely another triode amplifier with its plate connected to B+ voltage through resistor R29 and its cathode connected to ground through resistor R48 which is unbypassed to create negative feed-back stability. It can be seen that the signal reaching the grid of amplifier V4a is a more or less logarithmic function of the input signal from input pin 29 of the plug 30 up to the point at which amplifier V3b saturates due to the high level of signal fed to its grid. The circuit is so designed that amplifier V3b does not saturate until a compression range of more than 40 db is required.

The circuit as described above is capable of a compression range of 40 db, but in many instances, the input seismic signals are of such amplitude that a greater compression range is required in order to limit the recorded signal trace to one track on the recording medium. In this instance, a compression range of 80 db may be selected by means of switch 28. The greater compression range is achieved in the following manner. With switch 28 in the 80 db position, the second output of amplifier V3a through condenser C18 is fed through the switch 28a and resistor R55 to the grid of amplifier tube V4b which grid is connected to ground through grid resistor R58. The plate of amplifier tube V4b is connected directly to B+ voltage, and the cathode is connected to the cathode of amplifier tube V4a and to ground through the common cathode resistor R48. When the second output through condenser C18 of vacuum-tube amplifier V3a is thus connected and when the amplifier tube V3b saturates so that any further increase in grid signal will not be reflected in plate signal and therefore, not affect the grid of amplifier V4a, the signal through C18 acting on the grid of amplifier tube V4b acts to change the current flow through V4b and also the current flow through common cathode resistor R48 so that effectively the cathode voltage of V4a varies with respect to the grid voltage of V4a as the greater increase in signal which was not transmitted by the saturated tube V3b. By this means a signal above the amplitude which saturates V3b is reflected in the output from the plate of amplifier tube V4a.

The output, then, at the plate of amplifier tube V4a with switch 28a in either the 40 db or 80 db position is a voltage which varies logarithmically as the instantaneous voltage of the input at the terminal 29 of the plug 30. The logarithmic signal thus generated passes through coupling condenser C21 and resistors R65 and R54, used as a gain control, to one terminal 31 of the primary of impedance matching transformer T2, the other terminal 32 of which is connected to ground. The secondary of transformer T2 is connected to a full wave rectifier circuit consisting of diodes D5 and D6. The output of this rectifier is taken between the center tap 33 of the transformer and ground. From the rectifier the signal is fed to a filter circuit comprising inductances L5 and L6 and the six parallel resistor and capacitor networks comprised of R59 and C22, R60 and C23, R61 and C24, R62 and C25, R63 and C26, and R64 and C27 together with selector switch 34. The output of the rectifier and filter section just discussed is a D.-C. signal whose amplitude varies in proportion to the average level of the logarithmic signal fed to it. Therefore, it follows that the output varies in logarithmic proportion to the average level of the input signal fed to terminal 29 of the plug 30. Switch 34 is used to select the type filter desired for this signal and in this manner choose the time constant desired in the output signal. With switch 34 in the slow position, the response time will be comparatively slow but all ripple will have been removed from the output. The medium position of switch 34 produces a medium response time, but also a slight ripple and overshoot in the output. The fast position of the switch 34 achieves fast response time at the expense of greater ripple and overshoot in the output. The output of the filter circuit, which output is indicative of the logarithm of the average signal level of the input, is fed to a voltage divider consisting of resistors R56 and R57 in conjunction with switch 28b. With range switch 28b in the 80 db position, the output voltage of the rectifier-filter is divided between resistors R56 and R57 which have the same resistance. The signal from the junction of R56 and R57 to the grids of tubes V5a and V5b is then one-half the output voltage from the filter terminals. Changing switch 28b to the other position so that the full scale range of the meters and the galvanometer is now 40 db instead of 80 db shorts out resistor R56 so that the entire output voltage of the filter circuit is impressed on the grids of vacuum-tubes V5a and V5b. Vacuum-tubes V5a and V5b are connected in parallel with their plates connected to B+ voltage, their grids connected together and their cathodes connected to common cathode resistor R49. This arrangement is merely the common impedance matching device known as the cathode follower. The output signal is taken from resistor R49 and impressed across voltage divider network consisting of R50, R51, R52 to ground with R53 to a D.-C. bias voltage at a terminal 35 of plug 30. Two signal outputs are developed from this voltage divider network, one across resistor R50 to a monitoring ammeter M1 and the other across R51 to the galvanometer of the seismic camera recorder or to a magnetic recorder.

Reviewing, now, the steps in practicing the present invention, vibrations originated by the detonation of an explosive charge on or below the surface of the earth and reflected by sub-surface strata are detected by a plurality of seismometers at spaced points remote from the detonation point. The electrical signals generated by each of these seismometers in response to the vibrations are fed through preamplifiers to filters, one for each seismometer. These filters, will, when such action is desired, suppress all signal frequencies not within a chosen band of frequencies as selected by switch adjustments. The switch adjustments select various cutoff frequencies and degrees of rejection of frequencies outside the band pass by rearranging the internal filter component connections. Each filter supplies the input signal for an amplifier. In these amplifiers, the signal strength is increased but the amplitude contrast between the strong and the weak signals is greatly reduced through the action of the automatic gain control feature incorporated in the amplifiers so that signals of high amplitude will not exceed the limitations of the recording track when the amplifier gain is made sufficiently high to produce a weak signal amplitude large enough to permit recognition. The seismic signals as modified by the filters and amplifiers are then recorded for later analysis and interpretation.

To aid in the analysis and interpretation of the signals recorded as described above, two additional signals are recorded on the same record simultaneously with the seismic signals. These signals indicate the actual amplitude contrast of the seismic signals as detected by the seismometers. The two level indication signals are produced by a signal taken from one of the seismometers which feeds a device in parallel connection with the seismic amplifier and filter unit. After pre-amplification, the signals pass through two parallel channels. In one of the channels the signal passes through a filter with characteristics identical to those of the seismic filter and then through a logarithmic amplifier, a rectifier and a filter from which it emerges to the recorder. In the other channel the seismometer signal is not filtered before passing through the logarithmic amplifier, rectifier, and filter to the recorder. The record of these two D.-C. signals, representing the logarithm of the average signal levels of both the filtered and unfiltered seismic signals, provides an accurate and highly desirable reference to aid in the analysis of the seismic record.

Although the method of this invention has been described and illustrated using a specific circuit arrangement, it is not intended that the invention be so limited. Many changes and variations in the above described method of seismic surveying still within the spirit and scope of this invention will be obvious to those skilled in the art; therefore, this invention is to be limited only as set forth in the following claims.

What is claimed is:

1. Apparatus for indicating the amplitude level of seismic signals amplified by means of automatically gain controlled amplifiers and recorded on a record medium, said apparatus being comprised of a preamplifier, means feeding signals from a seismic wave detector to said preamplifier, means comprising parallel paths from said preamplifier, a first compressor unit, one of said parallel path means feeding said preamplified signal to said first compressor unit, filter means associated with said preamplifier, the other of said parallel path means feeding said filter means, a second compressor unit, means feeding said filtered signal to said second compressor unit, said first and second compressor units each being comprised of a logarithmic amplifier, a rectifier and a filter thereby providing a logarithmically amplified D.-C. signal of varying amplitude, and means feeding said D.-C. signals from said compressor units to said record medium for recording as separate signal level indicating traces.

2. Apparatus for indicating the amplitude level of seismic signals amplified by means of automatically gain controlled amplifiers and recorded on a record medium as defined in claim 1, said apparatus including switching means to select the sensitivity range of each of said compressor units.

3. Apparatus for indicating the amplitude level of seismic signals amplified by means of automatically gain controlled amplifiers and recorded on a record medium as defined in claim 1, said apparatus including switching means to increase the signal compression range of said compressor units.

4. Apparatus for indicating the amplitude level of seismic signals amplified by means of automatically gain controlled amplifiers and recorded on a record medium as defined in claim 1, said compressor units including voltage divider means whereby the logarithmically amplified D.-C. signal is fed additionally to a monitoring ammeter.

5. A method of providing seismic information comprising the steps of detecting seismic waves at at least one point, converting said waves into electrical signals, amplifying said signals by a degree varying as an inverse function of the amplitude of said signals, recording said amplified signals, simultaneously producing from said signals from said at least one point a varying D.C. voltage proportional to the logarithm of the amplitude of said signals, and recording said D.C. voltage.

6. A method of providing seismic information comprising the steps of detecting seismic waves at a plurality of points, converting said waves into electrical signals, amplifying said signals by degrees varying as inverse functions of the amplitudes of said signals, recording said amplified signals, simultaneously producing from the signals from one of said plurality of points a varying D.C. voltage proportional to the logarithm of said signals and recording said D.C. voltage.

7. A method of providing seismic information as defined in claim 6 wherein the said D.C. voltage is recorded as a separate trace on a recording medium.

8. A method of providing seismic information comprising the steps of detecting seismic waves at a plurality of points, converting said waves into electrical signals, filtering undesirable bands of frequencies from said signals, amplifying the filtered signals by degrees varying as inverse functions of the amplitudes of said filtered signals, recording the amplified filtered signals, simultaneously and separately filtering from the signals derived from one of said points said undesirable bands of frequencies, producing from the filtered signals derived from said one point a varying D.C. voltage proportional to the logarithm of the amplitude of said filtered signals derived from said one point, and recording said D.C. voltage.

9. A method of providing seismic information comprising the steps of detecting seismic waves at a plurality of points, converting said waves into electrical signals, filtering undesirable bands of frequencies from said signals, amplifying the filtered signals by degrees varying as inverse functions of the amplitudes of said filtered signals, recording the amplified filtered signals, simultaneously and in a first path filtering from the signals derived from one of said points said undesirable bands of frequencies, producing from the filtered signals derived from said one point a varying D.C voltage proportional to the logarithm of the amplitude said filtered signals derived from said one point, recording said D.C. voltage, simultaneously and in a second path producing from said signals derived from said one point a D.C. voltage proportional to the logarithm of the amplitude of said signals derived from said one point, and recording said last mentioned D.C. voltage.

10. A method of providing seismic information comprising the steps of detecting seismic waves at a plurality of points, converting said waves detected at each of said points to electrical signals, defining individual signal paths from each of said points, amplifying the signals in each of said individual paths, removing undesirable bands of frequencies from the signals in each of said individual paths, amplifying the signals in each of said individual paths by a degree varying as an inverse function of the amplitude of said signals in the path, recording said amplified signals in each of said individual paths, defining a second signal path from one of said plurality of points, amplifying said signals in said second path, dividing said second path to define a third and a fourth signal path, removing said undesirable bands of frequencies from the signals of said third path, producing from the remaining frequency bands in said signals of said third path a D.C. voltage proportional to the logarithm of the amplitude of said signals of said third path, recording said D.C. voltage, producing from the signals of said fourth path a D.C. voltage proportional to the logarithm of the amplitude of said signals in said fourth path, and recording said last mentioned D.C. voltage.

11. A method of providing seismic information comprising the steps of detecting seismic waves at a plurality of points, converting said waves detected at each of said points into electrical signals, defining individual signal paths from each of said points, amplifying the signals in each of said individual paths, removing undesirable bands of frequencies from the signals in some of said individual paths, amplifying the signals in each of said individual paths by a degree varying as an inverse function of the amplitude of said signals in the path, recording said amplified signals in each of said individual paths, defining a second signal path from one of said plurality of points, amplifying said signals in said second path, dividing said second path to define a third and a fourth signal path, removing said undesirable bands of frequencies from the signals of said third path, producing from the remaining frequency bands in said signals of said third path a D.C. voltage proportional to the logarithm of the amplitude of said signals of said third path, recording said D.C. voltage, producing from the signals of said fourth path a D.C. voltage proportional to the logarithm of the amplitude of said signals of said fourth path, and recording said last mentioned D.C. voltage.

References Cited in the file of this patent

UNITED STATES PATENTS

| | | |
|---|---|---|
| 2,049,724 | Prescott et al. | Aug. 4, 1936 |
| 2,352,869 | Tolk | July 4, 1944 |
| 2,420,672 | Maillet | May 20, 1947 |
| 2,424,705 | Parr | July 29, 1947 |
| 2,493,534 | Hawkins | Jan. 3, 1950 |
| 2,620,890 | Lee et al. | Dec. 9, 1952 |

OTHER REFERENCES

Chapman and Bogdan: "Bipolar Logarithmic Corona-Current Amplifier," Electronics Magazine, January 1953, pages 136–137.